(12) United States Patent
Sponton

(10) Patent No.: US 7,040,305 B2
(45) Date of Patent: May 9, 2006

(54) METHOD AND DEVICE FOR EXHAUST RECYCLING AND SUPERCHARGED DIESEL ENGINE

(75) Inventor: Ove Sponton, Vagnhärad (SE)

(73) Assignee: Scania CV AB (publ), (SE)

( * ) Notice: Subject to any disclaimer, the term of this patent is extended or adjusted under 35 U.S.C. 154(b) by 4 days.

(21) Appl. No.: 10/296,268

(22) PCT Filed: May 16, 2001

(86) PCT No.: PCT/SE01/01083

§ 371 (c)(1),
(2), (4) Date: Nov. 21, 2002

(87) PCT Pub. No.: WO01/90559

PCT Pub. Date: Nov. 29, 2001

(65) Prior Publication Data

US 2004/0007220 A1    Jan. 15, 2004

(30) Foreign Application Priority Data

May 22, 2000    (SE)    .................................... 0001896

(51) Int. Cl.
*F02M 25/07*    (2006.01)

(52) U.S. Cl. ................................................. 123/568.18
(58) Field of Classification Search ........... 123/568.11, 123/568.18
See application file for complete search history.

(56) References Cited

U.S. PATENT DOCUMENTS

| | | | |
|---|---|---|---|
| 4,094,285 | A | 6/1978 | Oyama et al. |
| 4,150,646 | A | 4/1979 | Aoyama et al. |
| 4,174,027 | A | 11/1979 | Nakazumi |
| 5,611,203 | A | 3/1997 | Henderson et al. |
| 5,611,204 | A | 3/1997 | Radovanovic et al. |

*Primary Examiner*—Henry C. Yuen
*Assistant Examiner*—Arnold Castro
(74) *Attorney, Agent, or Firm*—Ostrolenk, Faber, Gerb & Soffen, LLP

(57) ABSTRACT

A method and a device for exhaust gas recycling (EGR) in a combustion engine (1), wherein EGR gases are led into a section of the intake channel where a venturi (9) is arranged for modifying the flow of the intake air, and where a reduced pressure prevails because of modified flow, wherein at least a portion of the wall (10) of the venturi (9) is adjustable for varying the cross section of the venture and thereby for desired adjustment to prevailing operational conditions.

17 Claims, 3 Drawing Sheets

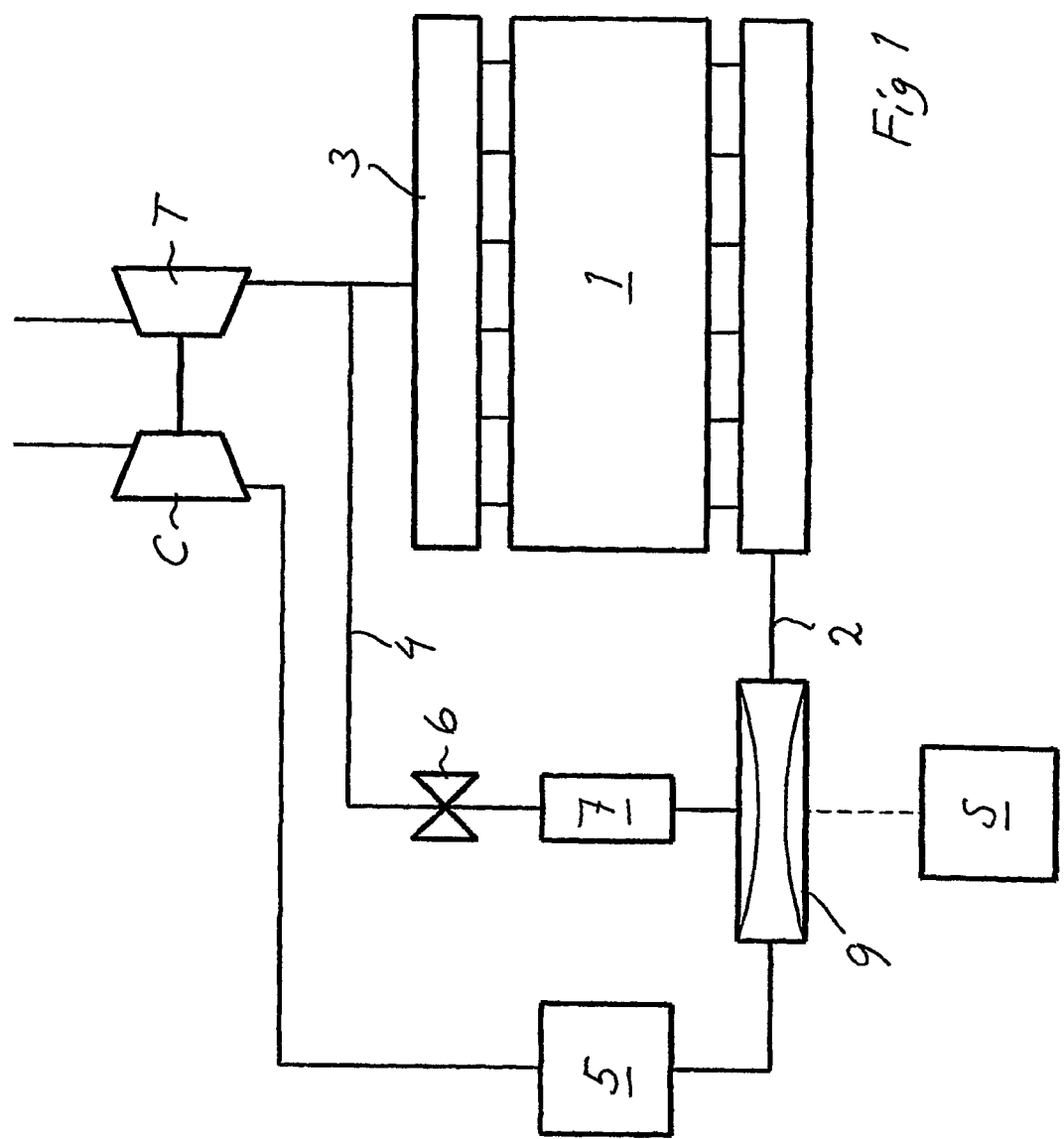

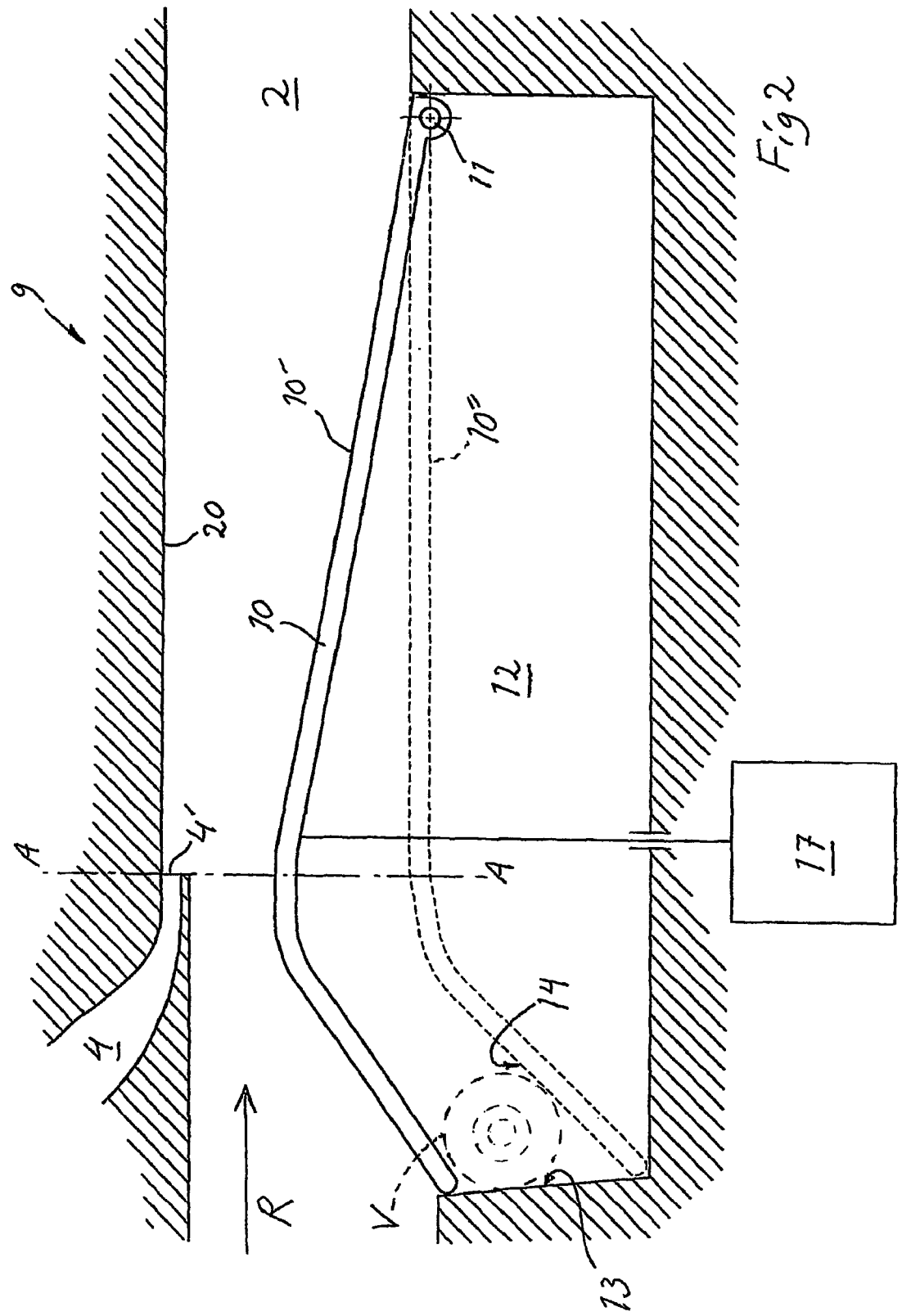

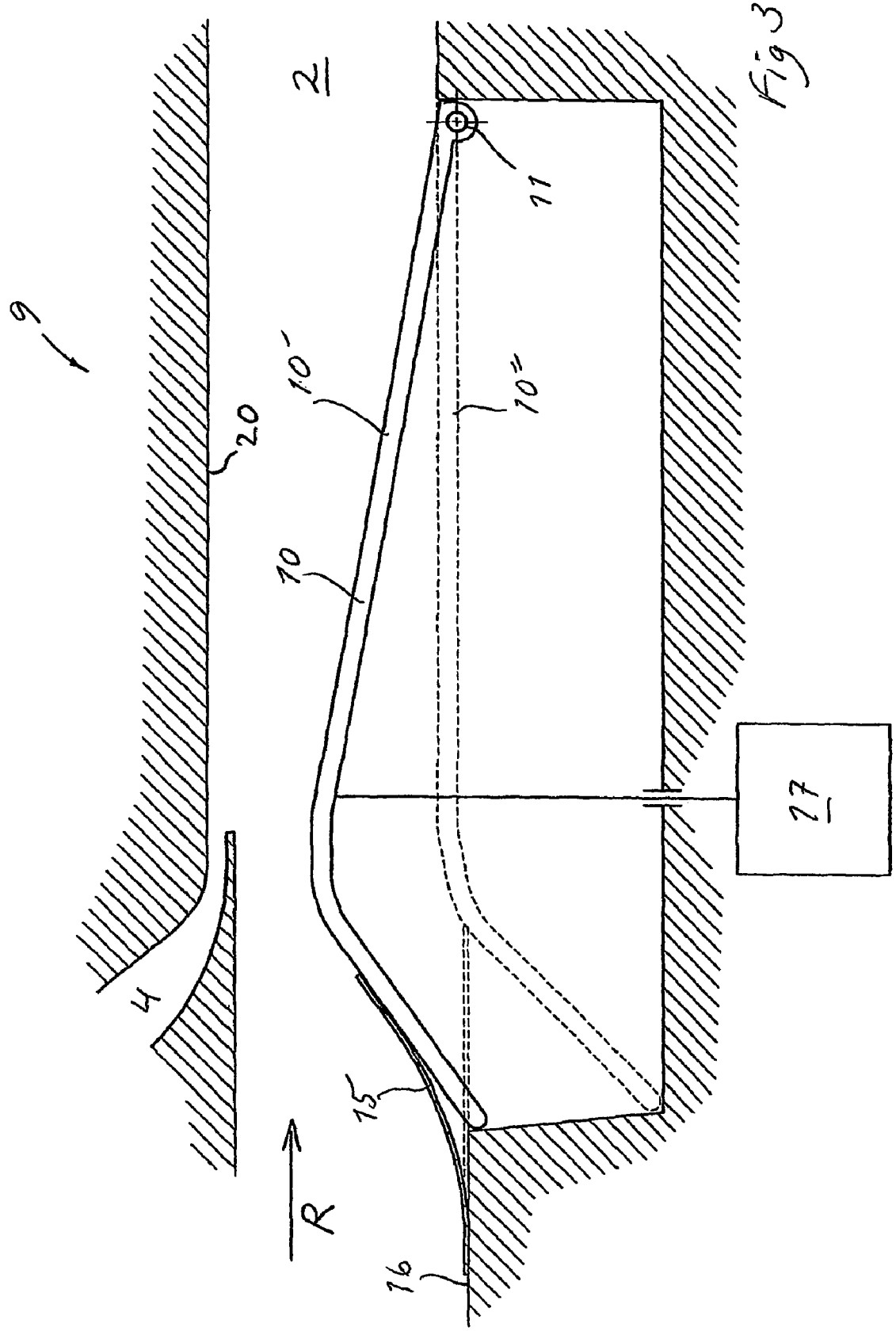

METHOD AND DEVICE FOR EXHAUST RECYCLING AND SUPERCHARGED DIESEL ENGINE

FIELD OF THE INVENTION

This invention concerns a method and a device for adjusting the flow of exhaust gas recycling gasses and intake air in a venturi section of an intake channel of an engine. It also concerns a supercharged engine including such a device.

DESCRIPTION OF PRIOR ART

In turbo-supercharged diesel engines it is previously known to recycle exhaust gases to the engine inlet in order to reduce contents of nitrous oxides in the exhaust gases. Hereby the recycled exhaust gases function as to lower the combustion temperature resulting in that a smaller amount of the nitrogen in the inlet air can be converted into nitrogen oxides. This process, usually called EGR (exhaust gas recirculation) has often been used in Otto engines as a relatively simple way of reducing the contents of harmful exhaust gas emissions. In diesel engines, on the other hand, this technique has not been employed to such a great extent depending i.a. on the fact that there are particular problems associated with these engines, making Otto engine solution not directly applicable in diesel engines.

One of these particular problems is that the combustion in diesel engines normally occurs with excess air. This indirectly results in need of transferring relatively large amounts of exhaust gases during a relatively large operating range of the engine in order to achieve the desired function. This problem is accentuated in case of an engine of the supercharged type, because in that case the pressure in the intake system of the engine is greater than the pressure in the exhaust gas system during a great part of the operating range.

It is previously known to use a separate supercharging device in order to obtain the desired increase of exhaust gas pressure, for example through WO96/18030 and WO96/18031. A drawback with these solutions is the need of the extra super-charging device or any other pressure increasing means, which makes these solutions both costly and bulky.

Also U.S. Pat. Nos. 5,611,203 and 5,611,204 could be mentioned as previously known art with respect to this invention. These documents describe how exhaust gases are recycled to the intake in turbo-supercharged diesel engines through a venturi device or any other kind of ejector being placed in the intake channel. The system according to these documents uses the low static pressure prevailing in a certain section of the ejector device for pumping-in an EGR flow into the charged air.

A major problem, which the devices according to these documents suffer from, is that flow resistance losses occur in the intake channel because of the configuration of the devices. As an example, the use of a valve blade in a by-pass channel brings along a pressure drop with resulting power waste for the engine.

SUMMARY OF THE INVENTION

It is an aim of this invention to provide a solution to or a reduction of the problems of the prior art. A main aim is thus to provide a simpler and more effective transfer of EGR gases in a combustion engine.

According to the invention this is achieved in a method and a device as above through providing a venturi in the intake channel of the engine and adjusting the cross section of the venturi by adjusting the position in the channel of a wall of the venturi, for modifying the flow of intake air and exhaust gas recycling gasses for the engine.

The invention makes it possible to minimise flow resistance losses since valve blades and similar control devices become unnecessary. Further, all intake air may be used for controlled EGR pumping in the venturi since no by-pass channel needs to be arranged. This gives great advantages since the pressure drop over the venturi device may be held at a minimum. Altogether the result will be enhanced engine performance.

By making it possible to adjust flow actuation by adjusting at least a portion of the wall, so that the amount of air and recycled gasses as well as time for recycling may be optimized. This adjustment is simple to obtain and results in effective variation, whereby EGR recycling simply can be optimized for the prevailing operation. The adjustment is preferably controlled by a suitable sequence being programmed in the usual engine control computer, said sequence preferably using data being supplied by the ordinary parameter sensors of the engine.

By the adjustment being obtained through a pivoting movement, a simply controlled movement pattern is achieved.

The channel for supplying EGR gases into the venturi device may be placed in a fixed or movable wall depending on what is suitable in a specific installation.

It is preferred that the venturi wall has a sideward recess wherein the adjustable wall portion is variably insertable. This way achieves a simple construction, making it possible for the venturi to be in principle out of function with a resulting minimal pressure drop when the adjustable wall portion is entirely inserted into the recess.

It is further preferred that the upstream portion of the adjustable wall portion is formed such that together with the adjoining wall of the recess, in inserted positions of the insertable wall portion, it forms a space where a natural vortex may be formed and stay in operation. This may be obtained for example by having these wall portions forming a space with essentially equilateral triangular section, that is that the surfaces includes an angle of about 60°.

As an alternative, a deformable membrane may be provided, which in a bridging manner connects the upstream portion of the adjustable wall portion with the adjoining wall of the recess. Hereby an essentially smooth wall configuration is obtained also in case of inserted positions of the adjustable wall portion.

If the opening of the EGR channel in the venturi is directed essentially in the flow direction of the intake air, it is achieved that pressure pulses in the EGR channel will not reduce the pumping effect.

It is preferred that the section of the venturi is essentially rectangular with adjustable height. This geometry gives simple construction and adjustability.

Further features and advantages of the invention become clear from the following description of embodiments.

BRIEF DESCRIPTION OF THE DRAWINGS

Embodiments exemplifying the invention will now be described in more detail with reference to the drawings, wherein:

FIG. 1 diagrammatically shows an embodiment of the invention in connection with a four-stroke turbo-supercharged diesel engine, FIG. 2 shows in more detail a device according to a first embodiment of the invention, and FIG. 3 shows a device according to a second embodiment of the invention.

DESCRIPTION OF EMBODIMENTS

FIG. 1 shows diagrammatically a combustion engine 1 of the piston engine type with cylinders arranged in a straight inline cylinder block. The engine is a four-stroke diesel engine adapted for a heavy vehicle such as a truck or a bus. Each cylinder is in its respective cylinder head in a conventional manner provided with at least one intake valve for supply of combustion air and at least one exhaust valve for discharge of exhaust gases from the combustion. An intake channel 2 leads the intake air to the cylinders whereas an exhaust collector 3 leads the exhaust gases from the cylinders to the turbine T and subsequently to the exhaust pipe.

Further, a transfer channel 4 is arranged for recycling EGR gases from the exhaust side of the cylinders to their intake side. The transfer channel 4 debouches in the intake channel 2 after a charging air cooler 5 and before a manifold to the cylinders. An EGR control valve 6 is positioned in the transfer channel whereby the transfer may be disconnected and possibly controlled to a certain extent.

The transfer channel 4 debouches in a section of the intake channel wherein venturi 9 is arranged in such a way that the flow of intake gases, which are charged by the compressor C, is modified so as to create a negative pressure at the passage of the venturi. This is because the air at the passage of a convex curved portion will be given an increased speed. According to the invention the EGR gases are led into said section in a portion in connection with the venturi where thus a negative pressure prevails. By shaping the venturi 9, in particular, i.a. with respect to curvature and length in the flow direction, it may be assured that an adequate negative pressure may be obtained so that a suitable amount of EGR gases may be transferred. S indicates a control computer for controlling the venturi as a response to parameter signals from the engine.

The venturi 9 is shown in more detail in FIG. 2, where an adjustable wall portion 10 is shown in a position 10', where it is brought into the channel 2 as much as possible and a position 10", where it is brought out from the channel 2 as much as possible with respect to a recess 12. The EGR transfer channel 4 debouches just about opposite that portion of the venturi 9 where the greatest negative pressure prevails. It is preferred that the channel 4 is arranged in a fixed wall 20 in the venturi but it may also debouch in the upper surface of the adjustable wall portion 10 (not shown). It is also preferred that the opening of the channel 4 in the venturi is directed in the flow direction in order to enhance transfer conditions.

11 indicates a pivoting shaft whereby the wall portion 9 may be adjusted for regulating the amount/portion of supplied EGR gases. In principle, the most inserted position 10' results in a greater negative pressure and a greater content of supplied EGR gases, whereas the brought out position 10" results in smaller or possibly no amount of supplied EGR gases at all.

The section through A–A of the shown venturi is rectangular which means that the surface of the wall portion 10, which is directed against the channel, is single-curved. The shape of this surface and its extension in the length direction and height direction is to be tested and dimensioned outgoing from engine data and desired EGR mixing conditions.

The recess 12 thus serves for receiving-the wall portion 10 in different retracted positions. It is preferred that the upstream portion 14 of the wall portion and the adjoining surface 13 of the recess in different retracted positions form a space having a section wherein a natural vortex V may be formed and be retained in operation. This gives an undisturbed operation without unwanted pressure fluctuations, which would otherwise occur if unstable vortices would be formed in this position.

Control of the amount of exhaust gases to be recycled is accomplished by the control system S (FIG. 1), which in a per see known manner communicates with sensors for sensing suitable engine parameters. The cooler 7 is arranged for cooling the recycled EGR gases. FIGS. 2 (and 3) also shows a setting means 17, which is controlled by the control system S (FIG. 1) and may be provided with an electrically hydraulically or pneumatically operated motor.

FIG. 3 shows an embodiment wherein a deformable membrane 15 is attached which provides a curve adjoining between the wall portion 10 and the fixed wall 16. The membrane may for example be made of spring steel.

The shape of the venturi 9 may thus vary depending on the present application. This also concerns the shape of the channel, but with the preferred embodiment, having a channel with a rectangular section, similar advantageous flow conditions are created over the width of the wall portion 10. The movement pattern of the wall portion 10 may be different if insertion into the channel 2 is accomplished in any other way, for example by displacement. Larger portions of the wall may also be deformable besides only the membrane 15.

It is within the scope of the invention that only some of the cylinders of an engine contribute to EGR recycling, for example through one of the blocks of a V-engine.

The invention has been described at the background of a super-charged four-stroke combustion engine, it is however, applicable in other kinds of combustion engines wherein similar problems or conditions prevail.

The invention claimed is:

1. A method for exhaust gas recycling in a combustion engine, wherein the engine has an intake channel for exhaust gasses and an intake for air and the engine has a venturi positioned for modifying flow of intake air to reduce pressure as caused by the modified air flow, the venturi having a wall;

the method comprising:

feeding exhaust gas recycling gasses from the engine into the venturi together with intake air; and adjusting at least a portion of the wall of the venturi for adjusting the cross section of the venturi to obtain a selected adjustment to intake air to adjust for selected operating conditions;

wherein the wall of the venturi is supported in the engine for pivoting for the adjusting; and the method comprises adjusting the cross section of the venturi by pivoting the adjustable portion of the wall;

wherein the venturi also has a fixed wall and the exhaust gas recycling gasses are led into the venturi through a channel opening in the fixed wall of the venturi.

2. A method for exhaust gas recycling in a combustion engine, wherein the engine has an intake channel for exhaust gasses and an intake for air and the engine has a venturi positioned for modifying flow of intake air to reduce pressure as caused by the modified air flow, the venturi having a wall;

the method comprising:
  feeding exhaust gas recycling gasses from the engine into the venturi together with intake air; and
  adjusting at least a portion of the wall of the venturi for adjusting the cross section of the venturi to obtain a selected adjustment to intake air to adjust for selected operating conditions;
  wherein the exhaust gasses are led into the venturi through a channel opening in a portion of the venturi adjacent to the adjustable wall portion of the venturi; and
  wherein the wall of the venturi is supported in the engine for pivoting for the adjusting step; and the method comprises adjusting the cross section of the venturi by pivoting the adjustable portion of the wall.

3. The method of claim 2, wherein passage of the intake air through the venturi creates a negative pressure adjacent the adjustable wall portion of the venturi to thereby draw the exhaust gas recycling gasses into the venturi and the engine air intake.

4. A method for exhaust gas recycling in a combustion engine, wherein the engine has an intake channel for exhaust gasses and an intake for air and the engine has a venturi positioned for modifying flow of intake air to reduce pressure as caused by the modified air flow, the venturi having a wall;
  the method comprising:
  feeding exhaust gas recycling gasses from the engine into the venturi together with intake air; and
  adjusting at least a portion of the wall of the venturi for adjusting the cross section of the venturi to obtain a selected adjustment to intake air to adjust for selected operating conditions;
  wherein the intake air has a direction of flow in the venturi, the method comprising leading the exhaust gas recycling gasses essentially in the flow direction of the intake gasses in the venturi; and
  wherein the exhaust gas recycling gasses are led essentially in the flow direction of the intake gasses in the venturi by forming an opening directed essentially in said flow direction.

5. The method of claim 4, wherein passage of the intake air through the venturi creates a negative pressure adjacent the adjustable wall portion of the venturi to thereby draw the exhaust gas recycling gasses into the venturi and the engine air intake.

6. A device for exhaust gas recycling in a combustion engine, wherein the engine has an intake channel leading into the engine; the device comprising:
  a venturi arranged in a section of the intake channel for modifying the flow of the intake air in the section of the intake channel, and a feed for exhaust gas recycling gasses into the venturi, the venturi being shaped and positioned for providing a reduced pressure in the intake channel because of modified flow;
  the venturi in the intake channel having a wall with at least a portion thereof which is adjustable for varying the cross section of the venturi for adjusting the airflow and the prevailing operational conditions in the venturi;
  wherein the venturi is defined by the adjustable wall and by a fixed wall; the feed for gasses comprising a feed channel for leading the exhaust gas recycling gasses into the venturi, and the feed channel opening in the fixed wall of the venturi; and
  wherein the adjustable wall portion is pivotable in the channel for adjusting the wall portion to vary the cross section of the venturi.

7. The device of claim 6, further comprising a recess in the section of the intake channel, the adjustable wall portion being above the recess, the adjustable wall portion adjustability comprises selectively moving the adjustable wall portion into or out of the recess.

8. The device of claim 6, wherein the feed for gasses comprises a feed channel in a portion of the venturi adjacent to the adjustable wall portion of the venturi for leading exhaust gas recycling gasses into the venturi.

9. The device of claim 6, further comprising a setting device for setting the position of the adjustable wall portion.

10. The device of claim 9, wherein the setting device includes an electric, hydraulic or pneumatic motor.

11. A device for exhaust gas recycling in a combustion engine, wherein the engine has an intake channel leading into the engine; the device comprising:
  a venturi arranged in a section of the intake channel for modifying the flow of the intake air in the section of the intake channel, and a feed for exhaust gas recycling gasses into the venturi, the venturi being shaped and positioned for providing a reduced pressure in the intake channel because of modified flow;
  the venturi in the intake channel having a wall with at least a portion thereof which is adjustable for varying the cross section of the venturi for adjusting the airflow and the prevailing operational conditions in the venturi;
  wherein the feed for gasses comprises a feed channel in a portion of the venturi adjacent to the adjustable wall portion of the venturi for leading exhaust gas recycling gasses into the venturi; and
  wherein the venturi comprises a recess in a side of said section of the intake channel, the adjustable wall portion being movable, within said recess, laterally of said intake channel for modifying the flow of the intake air in said section, the adjustability of the adjustable wall portion comprising selectively moving the adjustable wall portion into and out of the recess.

12. The device of claim 11, wherein the adjustable wall portion includes an upstream portion, the recess for the adjustable wall portion includes an adjoining wall adjoining the upstream portion of the adjustable wall portion, the upstream portion of the adjustable wall portion and the adjoining wall of the recess being so shaped and positioned that with gasses flowing through the venturi, a natural vortex of intake air may be created in and remain in the space between the adjustable wall portion and the adjoining wall of the recess in at least some inserted positions of the insertable wall portion in the recess.

13. A device for exhaust gas recycling in a combustion engine, wherein the engine has an intake channel leading into the engine; the device comprising:
  a venturi arranged in a section of the intake channel for modifying the flow of the intake air in the section of the intake channel, and a feed for exhaust gas recycling gasses into the venturi, the venturi being shaped and positioned for providing a reduced pressure in the intake channel because of modified flow;
  the venturi in the intake channel having a wall with at least a portion thereof which is adjustable for varying the cross section of the venturi for adjusting the airflow and the prevailing operational conditions in the venturi;
  wherein the feed for gasses comprises a feed channel in a portion of the venturi adjacent to the adjustable wall portion of the venturi for leading exhaust gas recycling gasses into the venturi;
  further comprising a recess in the section of the intake channel, the adjustable wall portion being above the recess, the adjustable wall portion adjustability comprising selectively moving the adjustable wall portion into and out of the recess; and wherein the adjustable wall portion has an upstream portion and the recess has an adjoining wall, a deformable membrane connecting the upstream portion of the adjustable wall portion with the adjustable wall of the recess in a bridging manner.

14. A device for exhaust gas recycling in a combustion engine, wherein the engine has an intake channel leading into the engine; the device comprising:

a venturi arranged in a section of the intake channel for modifying the flow of the intake air in the section of the intake channel, and a feed for exhaust gas recycling gasses into the venturi, the venturi being shaped and positioned for providing a reduced pressure in the intake channel because of modified flow;

the venturi in the intake channel having a wall with at least a portion thereof which is adjustable for varying the cross section of the venturi for adjusting the airflow and the prevailing operational conditions in the venturi;

wherein the feed comprises the venturi including a wall with a channel therein for entry of exhaust gas recycling gasses, and the channel having an opening directed essentially in the flow direction of the intake air in the venturi.

15. A device for exhaust gas recycling in a combustion engine, wherein the engine has an intake channel leading into the engine; the device comprising:

a venturi arranged in a section of the intake channel for modifying the flow of the intake air in the section of the intake channel, and a feed for exhaust gas recycling gasses into the venturi, the venturi being shaped and positioned for providing a reduced pressure in the intake channel because of modified flow;

the venturi in the intake channel having a wall with at least a portion thereof which is adjustable for varying the cross section of the venturi for adjusting the airflow and the prevailing operational conditions in the venturi;

wherein the venturi is defined by the adjustable wall and by a fixed wall; the feed for gasses comprising a feed channel for leading the exhaust gas recycling gasses into the venturi, and the feed channel opening in the fixed wall of the venturi; and wherein the venturi has a cross section that is essentially rectangular and the adjustable wall portion is adjustable for adjusting the height of the rectangle.

16. A method for exhaust gas recycling in a combustion engine, wherein the engine has an intake channel for exhaust gasses and an intake for air, and the engine has a venturi positioned for modifying flow of intake air to reduce pressure as caused by the modified air flow;

the method comprising:

feeding exhaust gas recycling gasses into the intake channel together with intake air into the venturi; and adjusting the cross section of the venturi for obtaining a desired adjustment to the flow through the venturi and according to selected operating conditions;

wherein the exhaust gas recycling gasses are led essentially in the flow direction of the intake gasses in the venturi by forming an opening directed essentially in said flow direction.

17. A device for exhaust gas recycling in a combustion engine, wherein the engine has an intake channel leading into the engine; the device comprising:

a venturi arranged in a section of the intake channel for modifying the flow of the intake air in the section of the intake channel, and a feed for exhaust gas recycling gasses into the venturi, the venturi being shaped and positioned for providing a reduced pressure in the intake channel because of modified flow;

the venturi being adjustable for varying the cross section of the venturi to modify the flow through the venturi and obtain a desired adjustment to the flow and to prevailing operating conditions;

wherein the feed comprises the venturi including a wall with a channel therein for entry of exhaust gas recycling gasses, and the channel having an opening directed essentially in the flow direction of the intake air in the venturi.

* * * * *